Jan. 6, 1953  D. E. ANDERSON  2,624,558
SUPPLEMENTARY FUEL FEED DEVICE
Filed Oct. 27, 1948
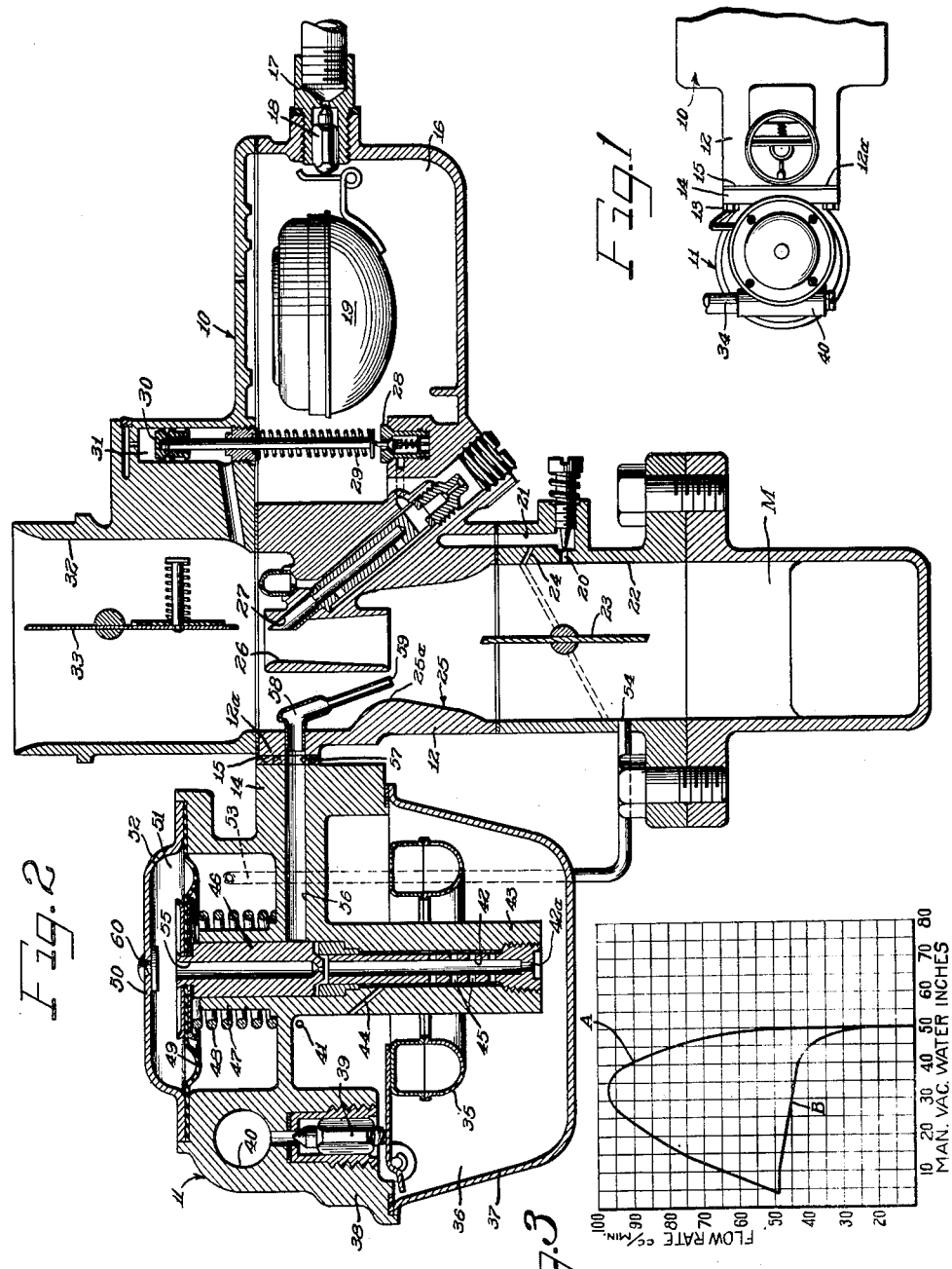
Inventor
David E. Anderson
By The firm of Charles W. Hill Attys Patented Jan. 6, 1953

2,624,558

UNITED STATES PATENT OFFICE 2,624,558

SUPPLEMENTARY FUEL FEED DEVICE

David E. Anderson, Shaker Heights, Ohio, assignor to Thompson Products, Inc., Cleveland, Ohio, a corporation of Ohio Application October 27, 1948, Serial No. 56,791

1 Claim. (Cl. 261—18)

This invention relates to a mounting for supplementary feed devices for internal combustion engines and more particularly to a carburetor flange mounting arrangement for devices which feed metered amounts of coolant or anti-knock fluid to the fuel intake of an internal combustion engine in accordance with varying engine requirements and in amounts closely correlated to such requirements.

It is known in the art that engine detonation varies with compression ratio, the quality and type of the fuel being burned, and load on the engine. Likewise, the feeding of supplementary fuels, such as water, alcohol and the like to internal combustion engines for suppressing such detonation and increasing the power output of the engine is known.

Various types of supplementary fuel feeding devices for injecting metered amounts of supplementary fuel into the main fuel-air stream entering the engine and for controlling the flow of fluid in accordance with varying engine conditions have been proposed. Since the manifold vacuum of an internal combustion engine decreases during these periods of heavy engine load, high speed, or rapid acceleration, it has proven feasible to control the amount of supplemental fuel by the use of feeding devices responsive to the manifold vacuum. However, the type of feeding devices heretofore employed to inject supplementary fuel into the main fuel-air combustion mixture effected the addition of supplementary fuel to the combustion mixture as it flowed through that portion of the fuel inlet located between the throttle butterfly valve and the engine intake manifold. Although such devices are vented directly to manifold pressure and are operative, it has been found that the rate of flow of supplementary fuel injected as above described is not at all times in proportion to the manifold pressure, and consequently the supplementary fuel is not metered into the fuel stream exactly as required. It has been found, under actual operating conditions, that the maximum flow rate of supplementary fuel is obtained at an intermediate manifold vacuum value rather than at those lower manifold vacuums where engine detonation and knock are most likely to occur. For this reason, the efficiency and operating economy of such devices has not been too good.

I have now found that the flow of supplementary fuel may be more clearly correlated with the manifold vacuum, and accordingly, the actual operating requirements of the engine, by mounting a supplementary fuel feeding device upon the engine carburetor to introduce supplementary fuel in the form of finely divided liquid particles into the main fuel-air stream as it passes through that portion of the fuel inlet lying between the throttle butterfly valve and the choke valve or, in any event, ahead of the throttle valve, while the intake vacuum for actuating the device is obtained from the intake at a point beyond the throttle valve. More particularly, in the present invention supplementary fuel is fed to an internal combustion engine at the venturi of the carburetor. If the engine on which the auxiliary feed device is employed has a carburetor with a high speed fuel inlet jet and an auxiliary venturi for this high speed jet, I prefer to inject supplementary fuel adjacent the exit mouth of the auxiliary venturi at the throat of the main venturi.

By injecting supplementary fuel into the main fuel-air stream at the carburetor venturi, the amount of supplementary fuel injected is more accurately controlled by the manifold vacuum and the operating conditions of the engine than the amount injected according to the prior art systems. The maximum supplementary fuel flow takes place at the lowest engine vacuum, as is desired, and the peak rate of flow does not occur at an intermediate manifold vacuum value as is the case in supplementary fuel devices herebefore provided. In a specific case, using identical supplementary feed devices calibrated to inject 50 cc. supplementary fuel per minute at 5 inches manifold vacuum, the flow rate of supplementary fuel at 35 inches of manifold vacuum was cut from 97 cc. per minute delivered by a device mounted as taught by the prior art to 44 cc. per minute delivered by a device mounted in accordance with the present invention. The 53 cc. per minute decrease in the amount of supplementary fuel injected represents a substantial saving in material since the device must be calibrated to feed a sufficient amount of supplementary fuel at the lower manifold vacuums where engine detonation is most likely to occur.

The supplemental fuel feed device according to this invention is directly mounted on a carburetor flange or pad to deliver through this pad to a nozzle discharging at the main Venturi throat of the carburetor in advance of the throttle valve, while manifold vacuum for actuating the drive is tapped off from beyond the throttle valve.

Accordingly, it is an important object of the present invention to provide a supplementary feed device for internal combustion engines for introducing supplementary fuel into the engine at a rate closely correlated with the actual operating requirements of the engine, thereby preventing wastage of the fuel.

It is another important object of the present invention to provide a mounting for supplementary fuel feeding devices for internal combustion engines whereby the maximum flow rate of supplementary fuel occurs at the lowest manifold vacuum value or under conditions at which engine detonation is most likely to occur.

A further object of the present invention is to provide a supplementary fuel feeding device for internal combustion engines to inject supplementary fuel into the main fuel-air mixture flowing through that portion of the fuel inlet located between the choke valve and the throttle valve of the carburetor to closely correlate the feeding of supplementary fuel with the actual operating requirements of the engine.

It is a still further important object of the present invention to provide a mounting for supplementary fuel feeding devices for internal combustion engines so that supplementary fuel may be fed into the engine at the throat of the main carburetor venturi to closely correlate the feeding of supplementary fuel with the operating requirements of the engine.

Other and further important objects of this invention will be apparent from the disclosures in the specification and the accompanying drawings.

On the drawings:

Figure 1 is a plan view of a supplementary fuel feed device mounted on the carburetor of an internal combustion engine in accordance with the present invention;

Figure 2 is a fragmentary vertical cross-sectional view of the supplementary fuel feed device and carburetor of Figure 1; and Figure 3 is a chart of supplementary fuel feed curves illustrating the feeding characteristics of a supplementary fuel feeding device mounted in accordance with the present invention as contrasted with the feeding characteristics of a similar device mounted as in the prior art.

As shown on the drawings:

In Figure 1, reference numeral 10 refers generally to a carburetor of an internal combustion engine and reference numeral 11 refers generally to a metering device for injecting supplementary cooling or anti-knock fluid into the engine. The feeding device 11 is mounted on a flat-faced pad or flange 12a of Venturi block 12 of carburetor 10 by suitable means, such as screws 13, passing through mounting flange 14 provided on the device 11 and through gasket 15 between the flange 14 and pad 12a.

As more particularly shown in Figure 2, the carburetor 10 has a housing defining a float chamber 16 connected to a main fuel supply through nipple 17, the flow of main fuel into the chamber 16 being regulated by a valve 18 controlled by float 19 disposed in the float chamber 16. Chamber 16 is connected to an idling fuel jet 20 by passage 21, the jet 20 opening into the throttle body 22 of the carburetor at a point beyond throttle butterfly valve 23. The throttle body 22 is secured to the engine intake manifold "M" to supply the fuel charge thereto. A low speed fuel jet 24 also joins passage 21 to the passage in throttle body 22 and is adapted to be closed when the throttle butterfly valve 23 is closed and the engine is idling.

The Venturi block 12 defines a main venturi 25 having a throat portion 25a and is provided with an auxiliary venturi 26 having a high speed fuel jet 27 for injecting fuel from float chamber 16 into the auxiliary venturi 26 at high speeds.

The carburetor 10 is also provided with a bypass power jet 28 controlled by a spring-urged valve 29 and a piston 30 operating in a chamber 31 vented to manifold vacuum on one side of the piston and to air pressure in air inlet chamber 32 on the other side of the piston. Choke valve 33 controls the flow of air through the air inlet chamber 32.

As shown in Figure 1, supplementary fuel is fed to the feeding device 11 through a feed line 34 connected to a source of supplementary fuel, such as a mixture of alcohol and water, contained in a suitable receptacle (not shown). A suitable supplementary fuel is composed of 85% methanol, 15% water, and 3 cc. per gallon of tetra ethyl lead.

The supplementary feeding device as shown in Figure 2 includes a float 35 mounted in a float chamber 36 defined by a bottom cup or bowl 37 and an upper casing 38, the float 35 controlling an inlet valve 39 receiving fluid from a passage 40 connected to feed line 34. Float chamber 36 is vented to atmosphere at 41, and fuel from the float chamber 36 flows through a fixed orifice 42a in the bottom of a tube 42 which is mounted in a depending boss 43 of the casing 38. The tube 42 is vented to atmosphere in float chamber 36 by a vent 44 in boss 43, and the passage through the tube is vented through holes 45 in the tube.

The flow of fluid through the tube 42 is controlled by a diaphragm and spring-urged valve 46. The valve 46 is guided by an upstanding portion 47 of boss 43, the valve being urged upwardly by spring 48 against the action of diaphragm 49 secured in position by cover plate 50 defining with the diaphragm 49 a chamber 51 vented to atmospheric pressure at 52. The under surface of diaphragm 49 is subjected to manifold vacuum through tube 53 extending from the casing 38 into the throttle body 22 at 54 below throttle butterfly valve 23. Valve 46 is provided with an axial bore 55 and, when valve 46 is lifted from its seated position, fluid from the float chamber 36 may flow through tube 42 into passage 56 formed in the casing 38 and the mounting flange 14. Gasket 15 is apertured as at 57 to allow fluid from passage 56 to flow therethrough. A nozzle 58, having a restricted orifice 59, is fitted into an aperture formed in Venturi block 12 of carburetor 10 in full communication with the passage 56 and the aperture 57. The nozzle 58 is inclined downstream in the Venturi block 12 and the orifice 59 is adjacent the outlet mouth of the auxiliary venturi 26 and also adjacent the throat 25a of the main venturi 25 of carburetor 12 to introduce a mist-like spray of finely divided particles into the main fuel-air mixture passing therethrough.

It will readily be seen that the diaphragm 49, exposed on its upper surface to atmospheric pressure of chamber 51 and exposed on its under surface to intake manifold pressure through tube 53, provides a ready means for controlling, through valve 46, the flow of supplementary fluid from the float chamber 33 into the Venturi throat 25. When the engine is operating under idling conditions, the vacuum in the intake manifold and on the under surface of the diaphragm 49 will be sufficiently large to cause the diaphragm 49 to move downwardly, moving the valve 46 to shut off flow of fluid from passage 42 to passage 56. Therefore, at idling speed or at conditions of high vacuum, where engine detonation or knock would not be encountered and auxiliary fuel is not required, the supplementary feeding device 11 completely shuts off the flow of supplementary fuel to the engine.

However, when the engine is operating under conditions of high load, rapid acceleration or high speed, the engine vacuum will be low and the vacuum against the under surface of diaphragm 49 will be decreased so that the spring 48 will lift valve 46 to establish flow of supplementary fuel and air through the tube 42, the passage 46 and the nozzle 59 for injection into the throat 25a of the carburetor venturi 25. If the decrease in manifold vacuum is not great enough to move the valve 46 sufficiently high to bring the upper surface of the valve into contact with the button 60 provided in the closure cap 50, additional air from air chamber 51 may flow through the bore 55 of valve 46 for admixture with supplementary fuel flowing through the passages 42 and 56. This admixture of air with supplementary fuel increases the economy of operating the engine and further aids in guaranteeing a sufficient quantity of air in the mixture of main fuel and air to be subsequently ignited in the combustion chambers of the engine.

When the engine is operating under a manifold vacuum sufficiently low so that spring 48 lifts the valve 46 into contact with the button 60, the stream of air flowing through the bore 55 for admixture with the supplementary fuel will be stopped and supplementary fuel admixed only with air from the holes 45 will be fed to the nozzle 59 into the carburetor venturi for mixture with the main fuel flowing therethrough. Under these conditions of extremely low manifold vacuum, a rich supplementary fuel mixture is required to more effectively prevent engine detonation and knocking.

By the mounting arrangement of the present invention, supplementary fuel in properly metered quantities and with proper amounts of air is intimately mixed in the carburetor venturi with a mixture of air and main fuel formed therein. The mixture of air and fuel when the engine is operating at low manifold vacuum is formed primarily in the auxiliary venturi and the supplementary fuel is introduced by means of the mounting herein provided at the point of maximum air and fuel turbulence and maximum velocity of the fuel-air stream, thus taking advantage of this turbulence and velocity to insure an even dispersion of supplementary fuel in the mixture of air and main fuel subsequently fed to the combustion chambers of the engine. The even distribution of supplementary fuel thus obtained cannot be obtained by those mountings previously employed in which supplementary fuel was injected at a point below the throttle valve of the engine, the supplementary fuel being mixed with the main fuel and air stream after the period of maximum turbulence and admixture of main fuel and air which occurs at the Venturi throat.

The mounting of a supplementary fuel device as herein provided thus makes possible a substantial saving in the amount of supplementary fuel injected into the engine. This saving is illustrated in the chart of Figure 3 of the drawings in which curve A represents the flow rate of auxiliary fuel actually fed into the main fuel-air mixture when employing a device such as hereinbefore described in accordance with the teachings of the prior art, in which introduction of the supplementary fuel takes place in the intake manifold below the butterfly throttle valve 23. In curve A the maximum flow rate is obtained at a manifold vacuum of approximately 32.5 inches of water, even though the maximum amount of supplementary fuel is needed at much lower manifold vacuums to prevent engine detonation and knock. Curve B represents the flow rate of supplementary fuel from a device mounted in accordance with the present invention for the injection of supplementary fuel at the venturi of the carburetor. The flow rate curve B, when compared with curve A, clearly illustrates the substantial saving of supplementary fuel made possible by the employment of the device mounted as herein described. In curve B, the maximum flow rate is attained at a manifold vacuum of less than 10 inches or at those manifold vacuums at which the supplementary fuel is actually needed. Curve B shows a diminishing of the flow rate when the manifold vacuum increases and as the possibility of engine detonation and knock decreases. That amount of supplementary fuel injected by the prior art devices at higher vacuums in excess of that injected at very low vacuums is largely wasted. These curves show a saving of supplementary fuel amounting to 53 cc. per minute at a manifold vacuum value of approximately 32.5. The advantages residing in the present invention in the substantial savings of supplementary fuel and in the closer correlation of the feed rate of supplemental fuel with the manifold vacuum will be evident to those skilled in the art.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

In a carburetor including a hollow throttle body adapted to be secured at one end to an intake manifold of an internal combustion engine, a butterfly throttle valve disposed in said throttle body, a main Venturi block having one end thereof secured to the other end of said throttle body and having a flow passage therethrough, said main Venturi block having a main Venturi portion projecting inwardly in said passage and extending from a point intermediate said one end and the other end thereof to a point adjacent said one end thereof, said main Venturi portion having an intermediate restricted throat, an auxiliary Venturi block supported within said main Venturi block and having a terminal outlet and adjacent said throat portion, and a main fuel jet projecting into said auxiliary Venturi block, said main Venturi block having a transverse opening between said other end thereof and said intermediate point and an outer flat-faced mounting pad around said opening, a generally L-shaped supplementary fuel nozzle having one leg journaled in said opening with the terminal end of the other leg disposed intermediate said terminal outlet end of said auxiliary venturi and said throat portion, a supplementary fuel feed device mounted on said pad and having a fuel chamber and a flow passage communicating with said chamber and said transverse opening, valve means in said passage, a diaphragm controlling said valve means, and a conduit extending from said throttle body intermediate said one end and said butterfly valve to said supplementary fuel feed device for subjecting said diaphragm to intake manifold pressure.

DAVID E. ANDERSON.

REFERENCES CITED

The following references are of record in the file of this patent:

UNITED STATES PATENTS

| Number | Name | Date |
|---|---|---|
| 1,924,595 | Chandler | Aug. 29, 1933 |
| 2,145,730 | Messinger | Jan. 31, 1939 |
| 2,212,926 | Wirth | Aug. 27, 1940 |
| 2,321,211 | Johnson | June 8, 1943 |
| 2,417,734 | Carlson et al. | Mar. 18, 1947 |
| 2,441,301 | Waag et al. | May 11, 1948 |
| 2,477,481 | Ericson | July 26, 1949 |